United States Patent
Tseng et al.

(10) Patent No.: US 8,552,285 B2
(45) Date of Patent: Oct. 8, 2013

(54) DEVICE AND METHOD FOR SOLAR-TRACKING ACCORDING TO SENSOR

(75) Inventors: Yu-Chee Tseng, Hsinchu (TW); Chia-Hung Tsai, Hsinchu (TW); Chun-Hsiang Huang, Taipei (TW)

(73) Assignee: National Tsing Hua University, Hsinchu (TW)

( * ) Notice: Subject to any disclaimer, the term of this patent is extended or adjusted under 35 U.S.C. 154(b) by 320 days.

(21) Appl. No.: 13/117,778

(22) Filed: May 27, 2011

(65) Prior Publication Data

US 2012/0168606 A1 Jul. 5, 2012

(30) Foreign Application Priority Data

Dec. 30, 2010 (TW) .............................. 99146832 A

(51) Int. Cl.
 *G01J 1/20* (2006.01)
(52) U.S. Cl.
 USPC ....................................... 136/246; 250/203.4
(58) Field of Classification Search
 None
 See application file for complete search history.

(56) References Cited

U.S. PATENT DOCUMENTS 6,960,717 B2 * 11/2005 Stuart et al. ................... 136/246

OTHER PUBLICATIONS

Jhuang, Rong-Han, "Design and Test of the Solar Tracker", Abstract on p. II, Keywords: HCPV, solar tracker, mechanism design, 1995, pp. 1-84.

Jhang, Jhih-Kai, "Tracking Control System of the Two Axes Passive Solar Tracker", Abstract on p. II, Keyword: HCPV, two axes passive solar tracking, sun-tracking control sytem, 1995, pp. 1-72.

Poulek, et al., "New Bifacial Solar Trackers and Tracking Concentrators", Czech University of Agriculture in Prague, 2007, pp. 1-9.

Luque-Heredia, et al., "11 Inspira's CPV Sun Tracking", 2007, pp. 221-251.

Lorenzo, et al., "Design of Tracking Photovoltaic Systems with a Single Vertical Axis", Progress in Photovoltaics: Research and Applications, 2002, pp. 533-543.

Roth, et al., "Cheap two axis sun following device", Energy Conversion & Management, 2005, pp. 1179-1192.

Blanco-Muriel, et al., "Computing the Solar Vector", Solar Energy, vol. 70, No. 5, 2001, pp. 431-441.

Roth, et al., "Design and construction of a system for sun-tracking", Renewable Energy 29, 2004, pp. 393-402.

Bakos, "Design and construction of a two-axis Sun tracking system for parabolic trough collector (PTC) efficiency improvement", Renewable Energy 31, 2006, pp. 2411-2421.

Chong, et al., "Design and construction of non-imaging planar concentrator for concentrator photovoltaic system", Renewable Energy 34, 2009, pp. 1364-1370.

Yousef, "Design and Implementation of a Fuzzy Logic Computer-Controlled Sun Tracking System", Department of Electrical Engineering, University of Qatar, IEEE Explore, 1999, pp. 1030-1034.

(Continued)

*Primary Examiner* — Tony Ko
(74) *Attorney, Agent, or Firm* — Muncy, Geissler, Olds & Lowe, PLLC

(57) ABSTRACT

The invention discloses a device and method for solar-tracking according to sensor. The device calculates the angle of incidence and azimuth of the sunray through the illuminance sensed by the sensors in different positions. The device rotates the solar panel to the direction with the maximal solar irradiation. Then the solar panel can sense the maximum illuminance to have the maximal energy gain.

19 Claims, 6 Drawing Sheets

(56) References Cited

OTHER PUBLICATIONS

Oner, et al., "Design of a new three-degree of freedom spherical motor for photovoltaic-tracking systems", Renewable Energy 34, 2009, pp. 2751-2756.

Clifford, et al., "Design of a novel passive solar tracker", Solar Energy 77, 2004, pp. 269-280.

Canada, et al., "Design of a sun tracking for the automaic measurement of spectral irradiance and construction of an irradiance database in the 330-1100 nm range", Renewable Energy 32, 2007, pp. 2053-2068.

Alata, et al., "Developing a multipurpose sun tracking system using fuzzy control", Energy Conversion and Management 46, 2005, pp. 1229-1245.

"Design and Test of the Solar Tracker", Abstract on p. II, Keywords: HCPV, solar tracker, mechanism design, 1995, pp. 1-84.

Chen, et al., "Digital sun sensor based on the optical vernier meauring principle", Institute of Physics Publishing, Measurement Science and Technology, 17, 2006, pp. 2494-2498.

Rubio, et al., "Application of new control strategy for sun tracking", Energy Conversion and Management 48, 2007, pp. 2174-2184.

Al-Mohamad., "Efficiency improvements of photo-voltaic panels using a Sun-tracking system", Applied Energy 79, 2004, pp. 345-354.

Mashohor, et al., "Evaluation of Genetic Algorithm Based Solar Tracking System for Photovoltaic Panels", National Chiao Tung University, ICSET 2008, pp. 269-272.

Hung, et al., "Feasibility study of one axis three positions tracking solar PV with low concentration ratio reflector", Energy Conversion and Management 48, 2007, pp. 1273-1280.

Agee, et al., "Feedback-Linearised Control of a Solar Power Platform With nonlinear Measurements", National Chiao Tung University, IEEE 2007, pp. 1-6.

Chong, et al., "General formula for on-axis sun-tracking system and its application in improving tracking accuracy of solar collector", Solar Energy 83, 2009, pp. 298-305.

Helwa, et al., "Maximum Collectable Solar Energy by Different Solar Tracking Systems", Energy Sources, Part A: Recovery, Utilization, and environmenta Effects 22: 1, 2009, pp. 23-34.

Alippi, et al., "An Adaptive System for Optimal Solar Energy Harvesting in Wireless Sensor Network Nodes", IEEE Transactions on Circuits and Systems-I: Regular papers, vol. 55, No. 6, Jul. 2008, pp. 1742-1750.

Sungur, "Multi-axes sun-tracking system with PLC control for photovoltaic panels in Turkey", Renewable Energy 34, 2009, pp. 1119-1125.

"Tracking Control System of the Two Axes Passive Solar Tracker", Abstract on p. II, Key word: HCPV, two axes passive solar tracking, sun-tracking control system, 1995, pp. 1-72.

Poulek, et al.,, "New Bifacial Solar Trackers and Tracking Concentrators", Czech University of Agriculture in Prague, pp. 1-9.

Canada, et al., "Design of a sun tracker for the automaic measurement of spectral irradiance and construction of an irradiance database in the 330-1100 nm range", Renewable Energy 32, 2007, pp. 2053-2068.

Aiuchi, et al., "Sensor-controlled heliostat with an equatorial mount", Solar energy 80, 2006, pp. 1089-1097.

Nault, "Basic Research Needs for Solar Energy Utilization", Argonne National Laboratory, 2005, pp. 1-260.

Alam, et al., "Simulation of Solar Radiation System", Americal Journal of Applied Sciences, 2005, pp. 751-758.

Chiang, et al., "Solar Orientation Measurement Systems with Integrated Solar Cells", The Open Construction and Building Technology Journal, 2008, 2,pp. 280-286.

Reda, et al., "Solar position algorithm for solar radiation applications", Solar Energy 76, 2004, pp. 577-589.

Luque-Heredia, et al., "11 Inspira's CPV Sun Tracking", pp. 221-251.

Carrasco., et al., "Power-Electronic Systems for the Grid Integration of Renewable Energy Sources: A Survey", IEEE Transactions on Industrial Electronics, vol. 53, No. 4, Aug. 2006, pp. 1002-1016.

Memlook, et al., "A Programmable Logic Controller to Control Two Axis Sun Tracking System", Information Technology Journal 5, 2006, pp. 1083-1087.

Lee, et al., "Sun Tracking Systems: A Review", Sensors, 2009, pp. 3875-3890.

Nuwayhid, et al., "The realizaiton of a simple solar tracking concentrator for university research applications", Renewble Energy 24, 2001, pp. 207-222.

Kribus, et al., A miniature concentrating photovoltaic and thermal system, Energy Conversion and Management 47, 2006, pp. 3582-3590.

Beshears, et al.,"Tracking Systems Evaluation for the 'Hybrid Lighting System'", Proceedings of ISEC, 2003, International Solar Energy Conference, Mar. 16-18, 2003, pp. 1-10.

Mousazadeh., et al., "A Review of principle and sun-tracking methods for maximizing solar systems output", Renewable and Sustainable Energy Reviews 13, 2009, pp. 1800-1818.

Abdallah, et al., "Two axes sun tracking system with PLC control", Energy Conversion and Management 45, 2004, pp. 1931-1939.

Grena, "An algorithm for the computating of the solar position", Solar Energy 82, 2008, pp. 462-470.

Berenguel., et al., "An artificial vision-based control system for automatic heliostat positioning offset correction in a central receiver solar power plant", Solar energy 76, 2004, pp. 563-575.

Omar, et al., An Automated Solar Photovoltaic Biaxial Tracking system: SoIT2A., First International Power and Energy Conference PECon, 2006, pp. 44-47.

\* cited by examiner

DEVICE AND METHOD FOR SOLAR-TRACKING ACCORDING TO SENSOR

This application claims the benefit of the filing date of Taiwan Application Ser. No. 099146832, filed on Dec. 30, 2010, the content of which is incorporated herein by reference.

BACKGROUND OF THE INVENTION (a) Field of the Invention

The invention relates to a device for solar tracking, particularly to a device for solar tracking capable of increasing efficiency of a solar panel.

(b) Description of the Related Art

In general, a solar-tracking device is mainly an open-loop solar tracking device. The astronomic theorem is used to master the trajectory of the sunrays and then the incident angle and the azimuth angle of the sunrays at any time and any geographical location can be obtained so that a solar panel can be adjusted accordingly to obtain or acquire the maximum illuminance of the solar panel. However, the open-loop solar tracking device needs a large amount of astronomic data in order to achieve the optimum precision of the system. Besides, the operation of calculating the trajectory of the sun according to the astronomic theorem should be constantly calibrated because the deviation occurs. For example, the deviation occurs when the Earth moves along its orbit.

If the open-loop solar tracking device is installed on a moving object, such as on a car, the result of solar tracking is not as good as expected. Thus, the data of the geographical location should be known. Even if a positioning system such as a global positioning system (GPS) is equipped in the car, it still results in the misjudgment in calculating the orientation of the sunrays according to the astronomic theorem due to the error of the positioning system.

Besides, because the open-loop solar tracking device determines the current position of the sun based on the calculation according to the astronomic theorem, even if the sun is blocked by clouds, the open-loop solar tracking device still moves according to the trajectory of the sun. However, when the sun is blocked by clouds, the sunrays are scattered or refracted by the clouds so that the expected position of the sun is not the best position to acquire the optimum energy. Thus, the open-loop solar tracking device cannot effectively increase the solar energy collection capacity when the sun is blocked by clouds.

BRIEF SUMMARY OF THE INVENTION

Therefore, in order to solve the above-mentioned problem, one object of the invention can be set on a movable device.

One object of the invention is to provide a device for solar-tracking to reduce production cost.

One object of the invention is to provide a device for solar-tracking to increase the solar energy collection capacity.

One object of the invention is to provide a device for solar-tracking to decrease the climate influence.

One embodiment of the invention provides a device for solar-tracking. The device comprises a plurality of sensors and an operation unit. The sensors are disposed at least three tangent points of a plurality of surfaces. The surfaces form a closed space. Each of the sensors will be assigned a virtual coordinate and performs a sensing procedure to generate a plurality of sensing values corresponding to the sunrays. The operation unit performs an operation of calculating a center of gravity. The operation of calculating a center of gravity uses the coordinate positions and the sensing values to calculate the position of the center of gravity.

One embodiment of the invention provides a method for solar-tracking. The method comprises the following steps: providing a plurality of surfaces forming a closed space wherein the closed space has an inscribed hemisphere; disposing a plurality of sensors on at least three tangent points of the surfaces wherein the sensors have coordinate positions, separately, for sensing the sunrays to generate a plurality of sensing values corresponding to the sunrays; performing an operation of calculating a center of gravity to generate a position of the center of gravity according to the coordinate positions and the sensing values; and adjusting orientation according to the position of the center of gravity.

DETAILED DESCRIPTION OF THE INVENTION

Figure 1A:
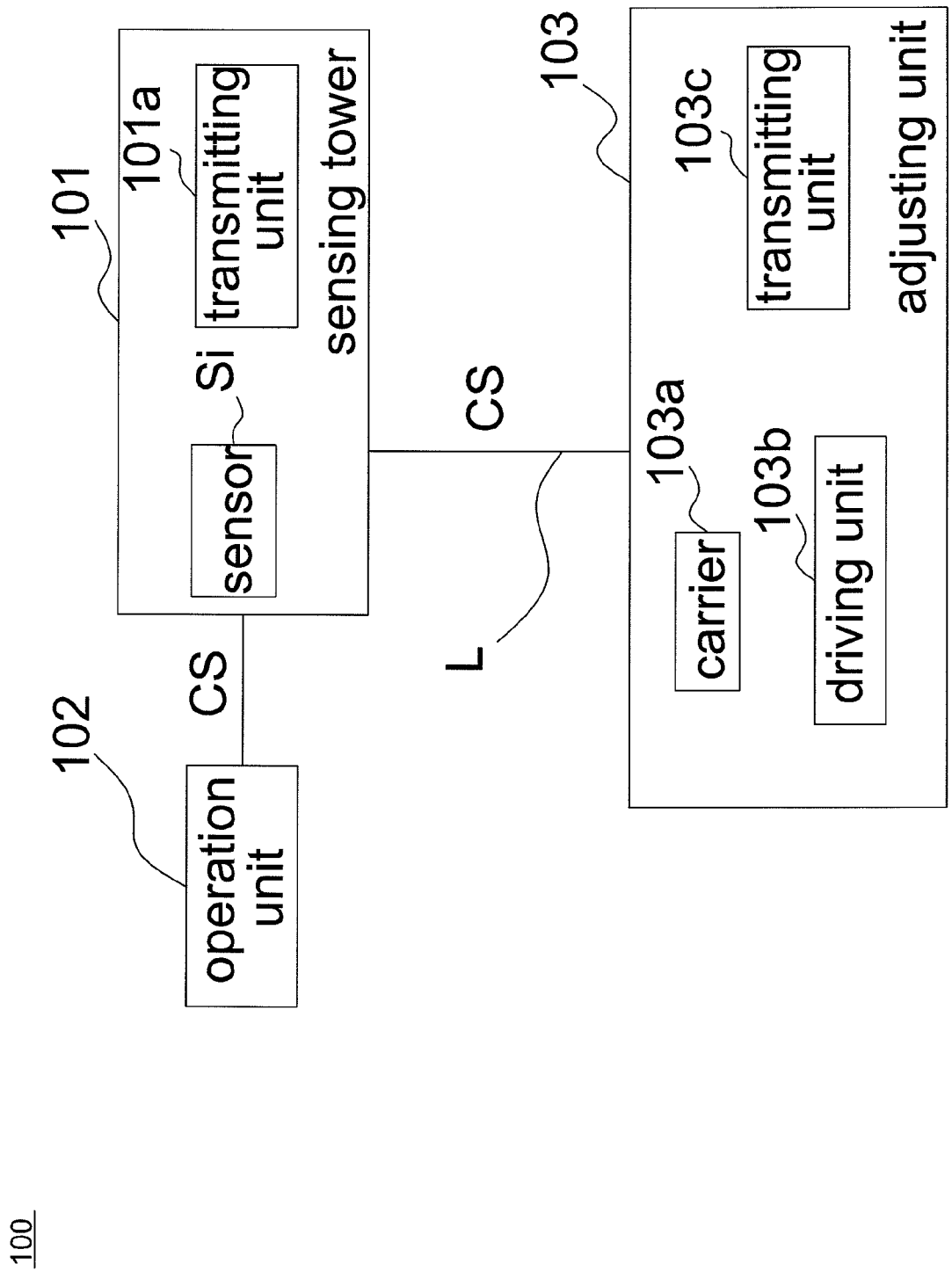
FIG. 1A shows a schematic diagram illustrating a device for solar-tracking according to sensors according to one embodiment of the invention.
Figure 1B:
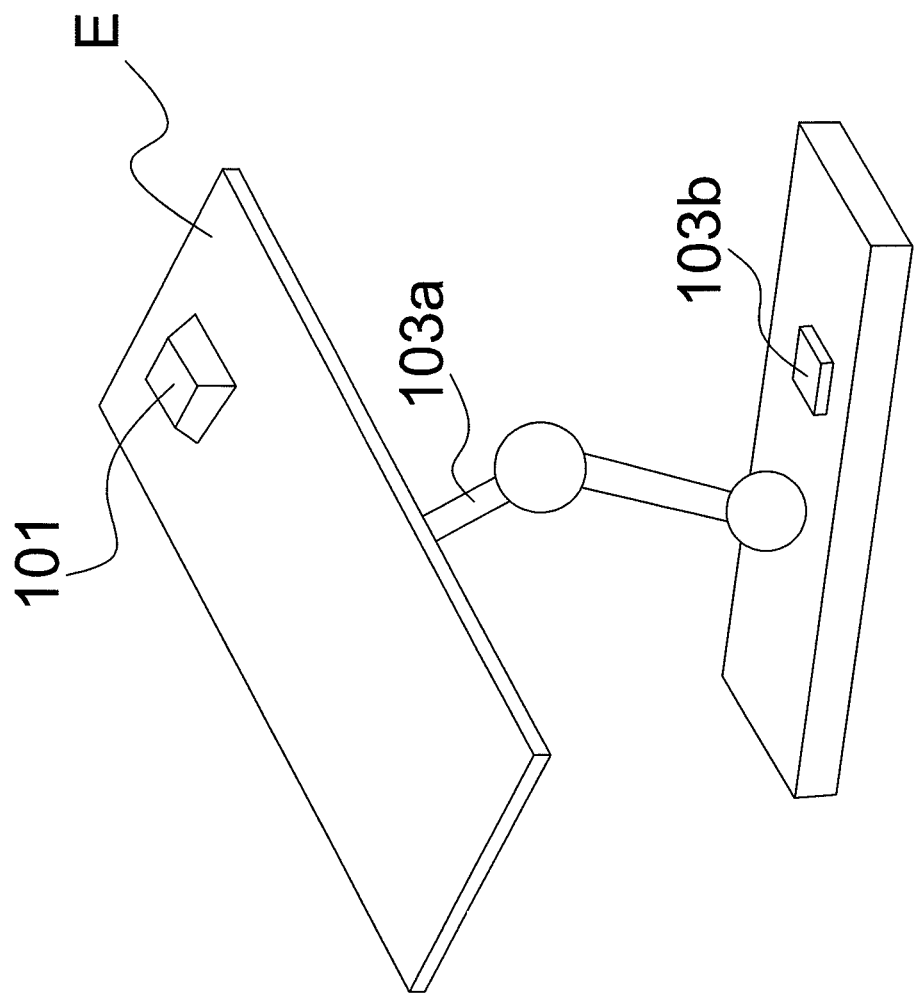
FIG. 1B shows a schematic diagram illustrating a device for solar-tracking according to sensors according to one embodiment of the invention.
Figure 1C:
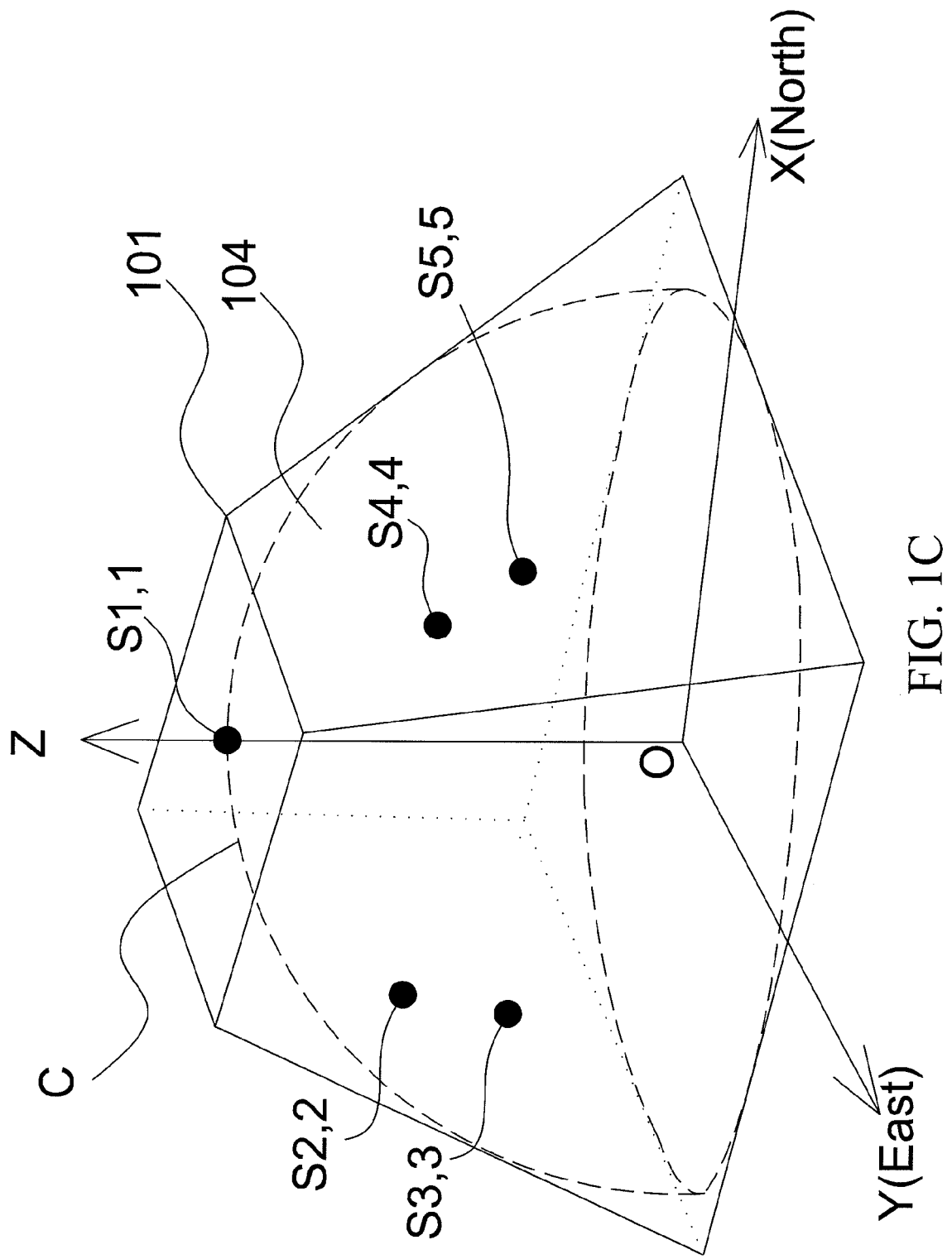
FIG. 1C shows a schematic diagram illustrating a sensing tower according to one embodiment of the invention.

Please refer to FIGS. 1A, 1B, and 1C. FIG. 1A shows a schematic diagram illustrating a device for solar-tracking according to sensors according to one embodiment of the invention. FIG. 1B shows a schematic diagram illustrating a device for solar-tracking according to sensors according to one embodiment of the invention. FIG. 1C shows a schematic diagram illustrating a sensing tower according to one embodiment of the invention. The device 100 for solar-tracking comprises a sensing tower 101, i sensors S1~Si, an operation unit 102, and an adjusting unit 103. The sensing tower 101 comprises n surfaces F1~Fn where the surfaces F1~Fn and the solar panel E form a closed space 104. In the above, "i" and "n" are separately positive integers greater than 3. The device 100 for solar-tracking in this embodiment comprises i sensors and n surfaces. For clarity, i=5 and n=5 for the device 100 in this embodiment. In other words, in this embodiment, the device 100 for solar-tracking comprises five sensors and five surfaces but is not limited to this example and the number can be increased according to needs.

It should be noted that the device 100 for solar-tracking in this embodiment uses five surfaces F1~F5 and the solar panel E to form the closed space 104. In another embodiment, three surfaces F1~F3 can be used to form the closed space 104 together with the solar panel E but the invention is not limited to the above examples.

The closed space 104 is composed by the sensing tower 101 and the solar panel E. Closed space 104 comprises an inscribed hemisphere C. In this embodiment, the inscribed hemisphere C is a virtual inscribed hemisphere. The inscribed hemisphere C and the surfaces F1~F5 comprise corresponding tangent points 1~5 and the sensors S1~S5 are disposed on the tangent points 1~5. It should be noted that the sensing tower 101 can be implemented by a cone or a polygonal cylinder and the cone or the polygonal cylinder can be embedded with an inscribed hemisphere.

In this embodiment, the sensing tower 101 comprises a transmitting unit 101a and the adjusting unit 103 comprises a carrier 103a, a driving unit 103b and a transmitting unit 103c. The operation unit 102 transmits a control signal CS to the transmitting unit 101a. The transmitting units 101a transmit the control signal CS to transmitting units 103c via the transmission medium L so that the adjusting unit 103 adjusts the orientation of the sensing tower 101 according to the control signal CS. The carrier 103a is used to carry the solar panel E and the driving unit 103b drives the carrier 103a according to the control signal CS.

The transmission medium L can be implemented by a wireless transmission module of Jennie 5139 but the invention is not limited to the above example. The transmission medium L can be implemented by any current or future wireless transmission module, or wired transmission module. The sensors S1~S5 are separately disposed on the surfaces F1~F5 and each of the sensors S1~S5 has a coordinate position. The sensors S1~S5 separately are used to sense the sunrays to generate sensing values corresponding to the sunrays. In this embodiment, the sensing values L1~L5 are illuminance of the sunrays sensed by the sensors S1~S5 and the surface F1 is parallel to the solar panel E. It should be noted that the surface F1 is not limited to be parallel to the solar panel E, for example, when the sensing tower is a cone (not shown).

Figure 2:
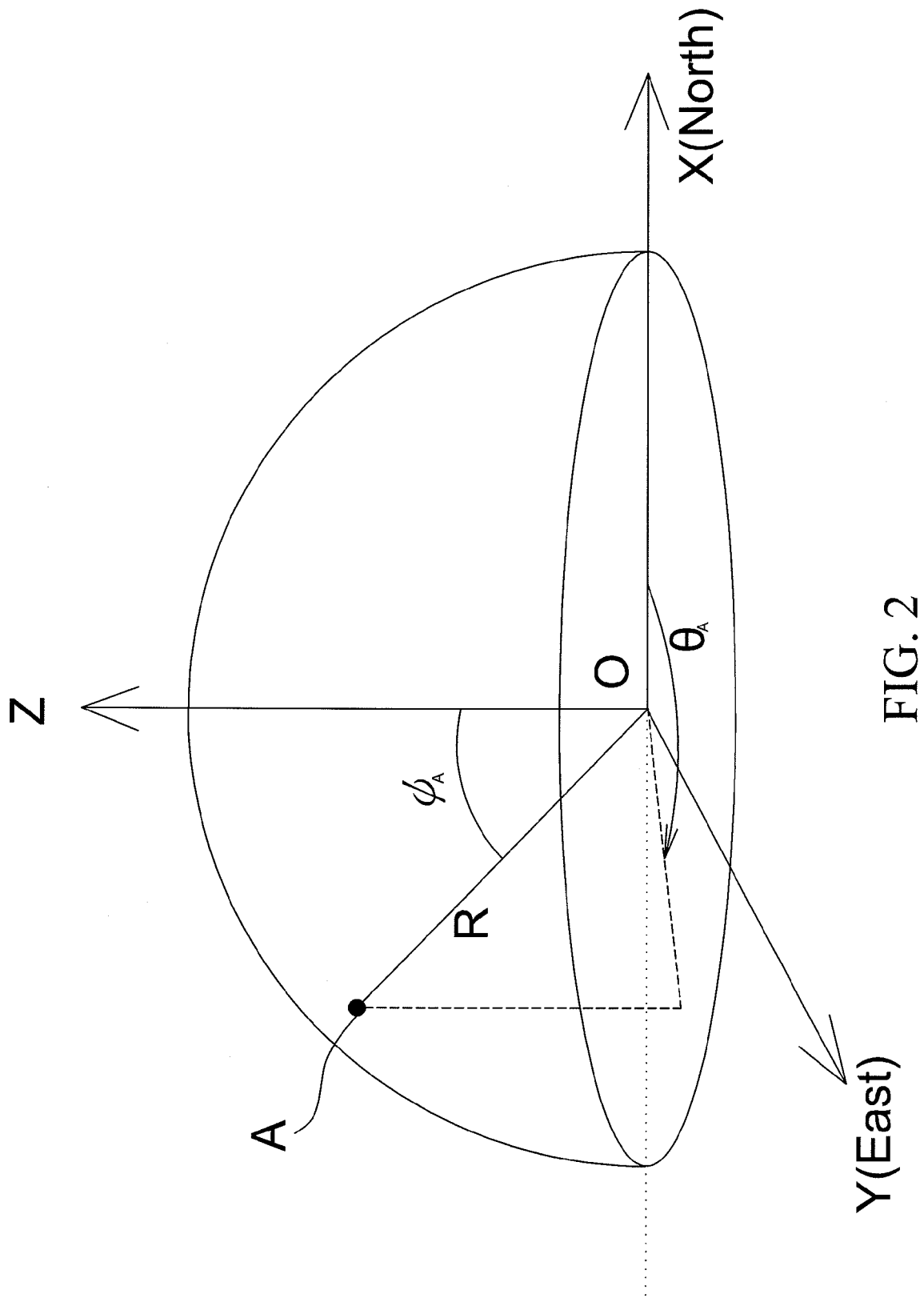
FIG. 2 shows a schematic diagram illustrating a spherical coordinate system according to one embodiment of the invention.

Then, referring to FIG. 2, this embodiment uses a spherical coordinate system to describe the initial operation of the device 100 for solar-tracking. In this embodiment, the center of the inscribed hemisphere C is as the origin O and a point A in the spherical coordinate system has a coordinate position of (R, $\phi_A$, $\theta_A$) where R is the radial distance from the origin O to the point A, $\phi_A$ is the angle between the line connecting the origin O and point A and Z axis; and $\theta_A$ is the angle between the projecting line of the line connecting the origin O and point A on the plane XY and X axis. In this embodiment, XY plane is parallel to the solar panel E, X axis is directed to North, Y axis is directed to East and Z axis is perpendicular to the solar panel E.

Figure 3:
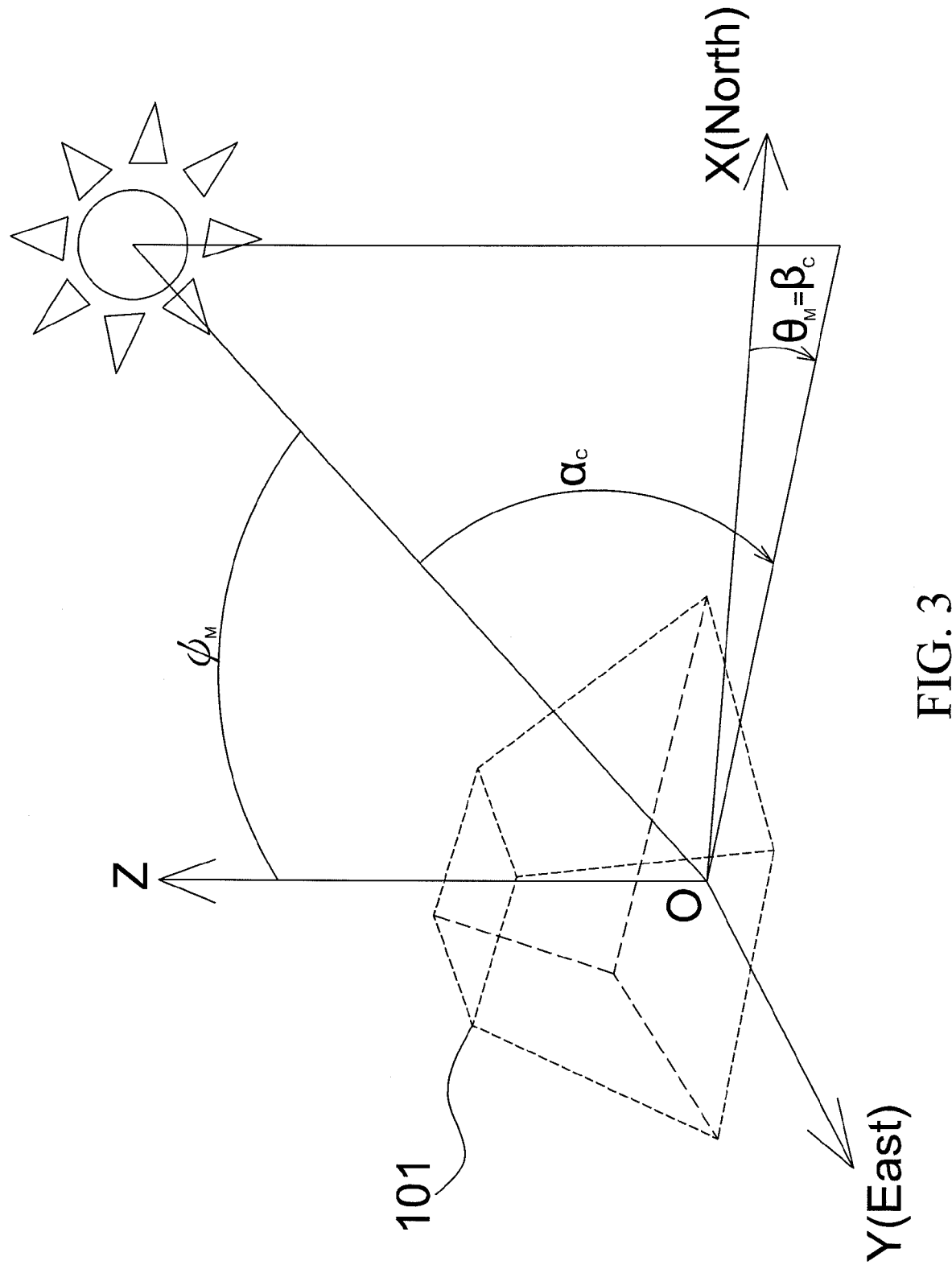
FIG. 3 shows a schematic diagram illustrating the incident angle and the azimuth angle of the sunrays according to one embodiment of the invention.

Referring to FIG. 3 simultaneously, in this embodiment, when the device 100 for solar-tracking starts initially, the solar panel E is parallel to the horizon. Assuming the spherical coordinate of the center of gravity M is ($R_M$, $\phi_M$, $\theta_M$) and the incident angle and the azimuth angle of the actual sunray are $\alpha$ and $\beta$, the ($R_M$, $\phi_M$, $\theta_M$) can be calculated from weighting the illuminance L1~L5 sensed by the sensors to the sensor's coordinates and then dividing to number of sensors. The required tilt angle for rotating the solar panel E is equal to the tilt angle $\phi_M$ of the center of gravity M. Thus, the required tilt angle for rotating the solar panel E is ($\phi_M$) or ($2\pi-\phi_M$) and the azimuth angle for rotating the solar panel E is $\theta_M$.

In other words, in the device for solar-tracking, the azimuth angle $\theta_M$ and the tilt angle $\phi_m$ of the center of gravity M is the estimated incident angle $\alpha_c$ and azimuth angle $\beta_c$ of the sunrays. Thus, when the device 100 for solar-tracking completes the adjustment of the solar panel E (when the center of gravity M is converged), the azimuth angle $\theta_M$ of the center of gravity M is actually equal to the azimuth angle $\beta$ of the sunray and the complementary angle of the tilt angle $\phi_M$ of the center of gravity M is actually equal to the incident angle $\alpha$ of the sunray.

For example, when the device 100 for solar-tracking starts initially, the incident angle and the tilt angle of the sunrays relative to the solar panel E are assumed to be ($\alpha_1$, $\beta_1$) (not shown). This embodiment uses five sensors S1~S5. The illuminance L1~L5 sensed by the sensors S1~S5 on the sensing tower 101 are used as the weights of the sensors S1~S5. Then, the spherical coordinate positions (R, $\phi_1$, $\theta_1$)~(R, $\phi_5$, $\theta_5$) of the sensors S1~S5 are used to calculate the position of the center of gravity M.

Since the coordinate positions of the sensors are defined by a spherical coordinate system and the method of calculating the center of gravity M of the invention is defined by the Cartesian coordinate system, each of the spherical coordinate positions of the sensors S1~S5 should be converted into the Cartesian coordinate position.

If the spherical coordinate position of the sensor Si is (R, $\phi_i$, $\theta_i$), the coordinate ($X_i$, $Y_i$, $Z_i$) in the Cartesian coordinate system can be converted by the following equations (1)~(3):

$$X_i = R \sin(\phi_i)\cos(\theta_i) \tag{1}$$

$$Y_i = R \sin(\phi_i)\sin(\theta_i) \tag{2}$$

$$Z_i = R \cos(\phi_i) \tag{3}$$

After conversion, the Cartesian coordinates ($X_1$, $Y_1$, $Z_1$)~($X_5$, $Y_5$, $Z_5$) of the sensors S1~S5 are acquired, separately. The sensing values L1~L5 (illuminance) acquired from the sensors are used as the weights of the sensors S1~S5 and the following equation (4) is used to acquire the Cartesian coordinate position of the center of gravity M.

$$(X_M, Y_M, Z_M) = \frac{L_1 \times (X_1, Y_1, Z_1) + L_2 \times (X_2, Y_2, Z_2) + \cdots + L_i \times (X_5, Y_5, Z_5)}{L_1 + L_2 + \cdots + L_5} \tag{4}$$

Then, the Cartesian coordinate ($X_M$, $Y_M$, $Z_M$) of the center of gravity M is converted into the spherical coordinate (R, $\phi_M$, $\theta_M$) by the equations (5)~(6).

$$\theta_M = \cos^{-1}\left(\frac{Z_M}{\sqrt{X_M^2 + Y_M^2 + Z_M^2}}\right) \tag{5}$$

$$\phi_M = \cos^{-1}\left(\frac{Z_M}{\sqrt{X_M^2 + Y_M^2 + Z_M^2} \times \sin\theta_M}\right) \tag{6}$$

Finally, the spherical coordinate (R, $\phi_M$, $\theta_M$) of the center of gravity M is acquired. Therefore, the transmission data of the operation unit 102 comprises the control signal CS corresponding to the spherical coordinate position (R, $\phi_M$, $\theta_M$) of the center of gravity M. Wherein, the transmission data of the operation unit 102 is transmitted through the transmitting unit 101a. Then, the transmitting unit 103c of the adjusting unit 103 receives the control signal CS so that the adjusting unit 103 adjusts the solar panel E according to the spherical coordinate position (R, $\phi_M$, $\phi_M$) of the center of gravity M. The adjusting unit 103 can perform clockwise or counterclockwise adjustment. Thus, when $X_M$ is larger than or equal to 0, the tilt angle of the clockwise rotation of the solar panel E is ($\phi_M$) and the azimuth angle is $\theta_M$. On the contrary, the tilt angle of the counterclockwise rotation of the solar panel E is ($\phi_M$) and the azimuth angle is $\theta_M$. At the time, the incident angle and the azimuth angle of the sunray relative to the solar panel E are assumed to be ($\alpha_2$, $\beta_2$)=($\pi/2-\phi_M$, $\theta_M$).

In one embodiment, when the adjusting unit 103 can only perform clockwise adjustment, the tilt angle $\phi_M$ of the center of gravity M is shown by the equations (7)~(8).

If $X_M$ is greater than or equal to $0 (X_M \geq 0)$, $$\phi_M = \cos^{-1}\left(\frac{Z_M}{\sqrt{X_M^2 + Y_M^2 + Z_M^2} \times \sin\theta_M}\right). \quad (7)$$

If $X_M$ is smaller than 0 $(X_M<0)$, $$\phi_M = 2\pi - \cos^{-1}\left(\frac{Z_M}{\sqrt{X_M^2 + Y_M^2 + Z_M^2} \times \sin\theta_M}\right). \quad (8)$$

If $X_M$ is greater than or equal to 0, the tilt angle $\phi_M$ of the center of gravity M is shown by the equation (7) and the tilt angle of the clockwise rotation of the solar panel E is ($\phi_M$) and the azimuth angle is $\theta_M$. If $X_M$ is smaller than 0, the tilt angle $\phi_M$ of the center of gravity M is shown by the equation (8) and the tilt angle of the counterclockwise rotation of the solar panel E is ($\phi_M$) and the azimuth angle is $\theta_M$.

It should be noted that the sensing tower 101 of this embodiment uses the coordinate relative to the solar panel E and thus the spherical coordinate positions (R, $\phi_1$, $\theta_1$)~(R, $\phi_5$, $\theta_5$) of the sensors S1~S5 relative to the solar panel E are unchanged.

After rotation, the sensing tower 101 performs a sensing procedure to acquire new sensing values L1~L5 and the operation unit 102 performs the above operation of calculating a center of gravity again to generate a new center of gravity NM. When the position of the new center of gravity NM is the same as that of the previous center of gravity M, it is considered converged. Thus, the solar panel E and the incident angle of the sunray are perpendicular. In other words, the surface F1 and the incident angle of the sunrays are perpendicular, or Z axis corresponds to the position of the sunray. It is to be noted that, when sensing tower 101 is implemented by a cone in another embodiment, it's not necessary perpendicular for the surface F1 and Z axis, but Z axis must direct to the sunray. When the previous and current incident angle and azimuth angle of the sunray relative to the solar panel E are the same (($\alpha_1$, $\beta_1$)=($\alpha_2$, $\beta_2$)), the adjusting unit 103 does not perform any adjustment. If not, the above method is performed for adjustment and the rest of the operating principle is the same as the above description and will not be given hereinafter.

Figure 4:
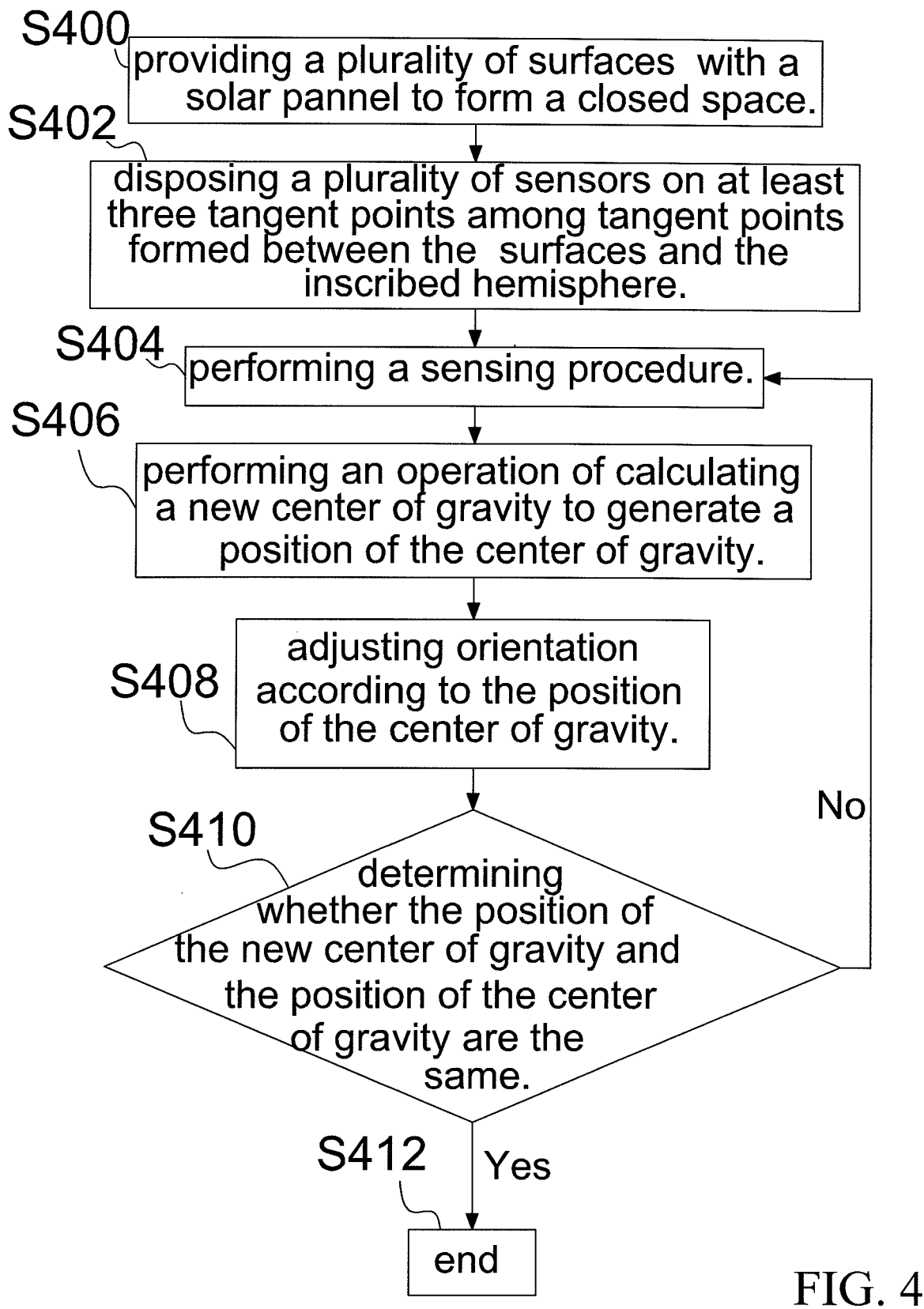
FIG. 4 shows a flow chart illustrating a method for solar-tracking according to one embodiment of the invention.

In one embodiment, when the included angle between the solar panel E and the surface 2~5 is between 60~65 degrees, convergence is the fastest. Please refer to FIG. 4. FIG. 4 shows a flow chart illustrating a method for solar-tracking according to one embodiment of the invention. The method comprises the following steps:

Step S400: providing a plurality of surfaces with a solar panel to form a closed space, wherein the closed space has an inscribed hemisphere;

Step S402: disposing a plurality of sensors on at least three tangent points among tangent points formed between the surfaces and the inscribed hemisphere wherein the sensors have coordinate positions, separately;

Step S404: performing a sensing procedure wherein the sensing procedure is to sense the sunrays to generate a plurality of sensing values corresponding to the sunrays;

Step S406: performing an operation of calculating a new center of gravity to generate a position of the center of gravity according to the coordinate positions and the sensing values;

Step S408: adjusting orientation according to the position of the center of gravity;

Step S410: determining whether the position of the new center of gravity and the previous position of the center of gravity are the same; if not, the position of the new center of gravity is fed back as the center of gravity for the orientation adjustment next time and go back to Step S404; if yes, go to Step S412; and Step S412: end.

In conclusion, the invention uses the sensing tower to improve the disadvantage of having low solar energy collection capacity due to ineffective solar tracking in the prior art. Besides, through the use of the sensing tower, the geographical position and the astronomic data of the installation location do not need to be known so that the cost of a solar tracking system is reduced. Even when the solar tracking system is installed on a car, solar tracking can be still effectively performed. Besides, the problem that the open-loop solar tracking device cannot effectively increase the solar energy collection capacity when the sun is blocked by clouds can be solved as well.

Although the present invention has been fully described by the above embodiments, the embodiments should not constitute the limitation of the scope of the invention. Various modifications or changes can be made by those who are skilled in the art without deviating from the spirit of the invention. Any embodiment or claim of the present invention does not need to reach all the disclosed objects, advantages, and uniqueness of the invention. Besides, the abstract and the title are only used for assisting the search of the patent documentation and should not be construed as any limitation on the implementation range of the invention.

What is claimed is:

1. A device for solar-tracking, comprising:
    a plurality of sensors, disposed at least three surfaces among a plurality of surfaces wherein the surfaces form a closed space and each of the sensors has a coordinate position and performs a sensing procedure so that a plurality of sensing values corresponding to the sunrays are generated; and
    an operation unit, for performing an operation of calculating a center of gravity wherein the operation of calculating a center of gravity uses the coordinate positions and the sensing values to calculate the position of the center of gravity.

2. The device according to claim 1, wherein the sensors and the surfaces form a sensing tower.

3. The device according to claim 2, wherein the sensing tower in space is a solid structure or a virtual structure.

4. The device according to claim 3, further comprising:
    an adjusting unit, for adjusting orientation of the sensing tower according to the position of the center of gravity so as to adjust solar-tracking orientation of the device.

5. The device according to claim 4, wherein the closed space has an inscribed hemisphere, the inscribed hemisphere and the surfaces form a plurality of tangent points, and the sensors are disposed on the tangent points.

6. The device according to claim 5, wherein sensing tower is a cone or a polygonal cylinder and the cone or the polygonal cylinder is embedded with the inscribed hemisphere.

7. The device according to claim 5, wherein the inscribed hemisphere is a virtual inscribed hemisphere.

8. The device according to claim 5, wherein the sensing tower has a first surface and the first surface is parallel to a solar panel and the center of the inscribed hemisphere is located on the solar panel of the device.

9. The device according to claim 8, wherein the device comprises i sensors, the center of the inscribed hemisphere is as the origin, the coordinate positions of the sensors correspond to a plurality of spherical coordinate positions are (R, $\phi_1$, $\theta_1$)~(R, $\phi_i$, $\theta_i$) of the solar panel, the sensors sense the sensing values $L_1$~$L_i$, the spherical coordinate positions (R, $\phi_1$, $\theta_1$)~(R, $\phi_i$, $\theta_i$) of the sensors have the corresponding Cartesian coordinate positions ($X_1$, $Y_1$, $Z_1$)~($X_i$, $Y_i$, $Z_i$), and the Cartesian coordinate position ($X_M$, $Y_M$, $Z_M$) of the center of gravity substantially satisfies the following equation:

$$(X_M, Y_M, Z_M) = \frac{L_1 \times (X_1, Y_1, Z_1) + L_2 \times (X_2, Y_2, Z_2) + \cdots + L_i \times (X_i, Y_i, Z_i)}{L_1 + L_2 + \cdots + L_i}$$

where i is a positive integer greater than 3.

10. The device according to claim 9, wherein the position of the center of gravity is converted from the Cartesian coordinate ($X_M$, $Y_M$, $Z_M$) into the spherical coordinate (R, $\phi_M$, $\theta_M$) and the adjusting unit adjusts the tilt angle of the solar panel to $\phi_M$ and the azimuth angle to $\theta_M$.

11. The device according to claim 10, wherein the adjusting unit comprises:
a carrier, for carrying a solar panel; and
a driving unit, for driving the carrier so as to adjust the solar panel according to the center of gravity.

12. The device according to claim 11, wherein the sensing tower comprises a first transmitting unit, the first transmitting unit comprises a second transmitting unit, the operation unit transmits a control signal to the first transmitting unit, the first transmitting unit transmits the control signal and the second transmitting unit receives the control signal through a transmission medium, the adjusting unit adjusts the orientation of the solar panel according to the control signal, and the control signal comprises parameters of the position of the center of gravity.

13. The device according to claim 12, wherein, after the adjusting unit adjusts the orientation of the solar panel according to the position of the center of gravity, the sensors performs a sensing procedure again and the operation unit performs an operation of calculating the center of gravity again to generate a new position of the center of gravity, the adjusting unit adjusts the orientation of the solar panel again; and when the new position of the center of gravity and the position of the center of gravity is substantially the same, convergence is reached.

14. The device according to claim 11, wherein, when the included angle between the solar panel and the surface is between 60~65 degrees, convergence is the fastest.

15. The device according to claim 1, wherein the device can be positioned on a movable device.

16. A method for solar-tracking, comprising:
providing a plurality of surfaces forming a closed space wherein the closed space has an inscribed hemisphere;
disposing a plurality of sensors on at least three tangent points among tangent points formed between the surfaces and the inscribed hemisphere wherein each of the sensors has a coordinate position;
performing a sensing procedure wherein the sensing procedure is to sense the sunrays to generate a plurality of sensing values corresponding to the sunrays;
performing an operation of calculating a center of gravity to generate a position of the center of gravity according to the coordinate positions and the sensing values; and
adjusting orientation according to the position of the center of gravity.

17. The method according to claim 16, wherein the method of solar tracking comprises:
using the coordinate positions of the i sensors corresponding to a solar panel wherein the coordinate positions correspond to a plurality of spherical coordinate positions (R, $\phi_1$, $\theta_1$)~(R, $\phi_i$, $\theta_i$) of the solar panel, the sensors sense the sensing values $L_1$~$L_i$, the spherical coordinate positions (R, $\phi_1$, $\theta_1$)~(R, $\phi_i$, $\theta_i$) of the sensors have the corresponding Cartesian coordinate positions ($X_1$, $Y_1$, $Z_1$)~($X_i$, $Y_i$, $Z_i$), and the Cartesian coordinate position ($X_M$, $Y_M$, $Z_M$) of the center of gravity substantially satisfies the following equation:

$$(X_M, Y_M, Z_M) = \frac{L_1 \times (X_1, Y_1, Z_1) + L_2 \times (X_2, Y_2, Z_2) + \cdots + L_i \times (X_i, Y_i, Z_i)}{L_1 + L_2 + \cdots + L_i}$$

where i is a positive integer greater than 3.

18. The method according to claim 17, wherein the position of the center of gravity is converted from the Cartesian coordinate ($X_M$, $Y_M$, $Z_M$) into the spherical coordinate ($R_M$, $\phi_M$, $\theta_M$) and the tilt angle of the solar panel is adjusted to $\phi_M$ and the azimuth angle is adjusted to $\theta_M$.

19. The method according to claim 18, wherein, after the orientation is adjusted according to the position of the center of gravity, the sensing procedure is performed again and the operation of calculating the center of gravity is performed again to generate a new position of the center of gravity, the orientation is adjusted again; when the new position of the center of gravity and the position of the center of gravity is substantially the same, convergence is reached; and when the included angle between the solar panel and the surface is between 60~65 degrees, convergence is the fastest.

\* \* \* \* \*